United States Patent [19]
Fishman

[11] Patent Number: 5,982,517
[45] Date of Patent: Nov. 9, 1999

[54] METHOD AND SYSTEM FOR SERVICE RESTORATION IN OPTICAL FIBER COMMUNICATION NETWORKS

[75] Inventor: Ilya M. Fishman, Palo Alto, Calif.

[73] Assignee: Fishman Consulting, Palo Alto, Calif.

[21] Appl. No.: 08/867,346

[22] Filed: Jun. 2, 1997

[51] Int. Cl.$^6$ .............................. H04B 10/20; H04J 14/00
[52] U.S. Cl. ......................... 359/119; 359/110; 359/125; 370/222; 370/405
[58] Field of Search .................................... 359/110, 119, 359/123–125, 128; 370/405–406, 907, 222

[56] References Cited

U.S. PATENT DOCUMENTS

| | | | |
|---|---|---|---|
| 5,448,389 | 9/1995 | Peacock | 359/119 |
| 5,576,875 | 11/1996 | Chawki et al. | 359/125 |
| 5,757,768 | 5/1998 | Goto et al. | 370/222 |
| 5,760,935 | 6/1998 | Sabry et al. | 359/119 |

*Primary Examiner*—Kinfe-Michael Negash
*Attorney, Agent, or Firm*—Bella Fishman

[57] ABSTRACT

A service restoration system and method for a mixed SONET/WDM optical fiber telecommunication networks comprising a plurality of self healing SONET rings and at least one WDM link which is shared by these SONET rings, provides protection on the optical layer of at least one WDM link in case of fiber or cable cut. The WDM link protection is provided by rerouting the WDM link traffic through a dedicated protection ring which is selected from the plurality of self healing SONET rings, via color blind optical fiber-to-fiber switches. The WDM working equipment protection is provided by rerouting the SONET traffic via additional optical switches and wavelength converters through WDM link. Wavelength converter aligns the wavelength of the optical signal to match the wavelength of failed WDM channel, to localize and heal the failure of the WDM working equipment without reporting to the adjacent nodes.

18 Claims, 8 Drawing Sheets

METHOD AND SYSTEM FOR SERVICE RESTORATION IN OPTICAL FIBER COMMUNICATION NETWORKS

BACKGROUND OF THE INVENTION

The present invention relates to a restoration technique in mixed telecommunication networks comprising SONET (Synchronous Optical NETwork) rings and WDM (Wavelength Division Multiplexing) point-to-point links.

Wide-scale deployment of WDM systems carrying many independent traffic channels (8/16/32 and more) over the same fiber transformed the ideas of all-optical networking to a reality of telecommunication business. All-optical networking has been a subject of both academic and applied research for over a decade [A. Elrefaie, Self-healing Ring Network Architecture Using WDM for Growth, In ECOC'91, 285, Paper TuPt.16, 1991; F. J. Janniello, R. Ramaswami, and D. G. Steinberg, A Prototype Circuit-Switched Multi-wavelength Optical Metropolitan-area Network, J. Lightwave Tech. 11, 777, 1993]. The viewpoint developed along the lines of this research predicts specific sequence of all-optical networking development. One of the well known strategies suggests that point-to-point WDM systems should be deployed first. This prediction is already confirmed by the industrial development. As a next step, deployment of tunable add-drop multiplexers and eventually of all-optical rings is predicted, in direct analogy with SONET ring architecture. It was also expected that the optical layer services such as optical restoration, wavelength translation etc. will be implemented together with the optical rings. However neither tunable add-drop multiplexers or optical rings are intended for deployment. An opposite tendency exists to use the capability of WDM systems to upgrade the fiber capacity without building additional SONET rings. The point-to-point WDM links allow to increase network capacity but they have no built-in mechanisms for service protection (restoration) in case of fiber or cable cut. For protection purposes, WDM links employ the algorithms of protection acquired from SONET rings.

SONET rings have built-in fiber structure (working and protection fibers) for service restoration. In case of fiber or cable cut, the traffic is switched from the failed working fiber to the protection fiber using electronic (customary) or optical switches. SONET rings are also provisioned for equipment protection, usually on 1+1 basis when for each working network element, a stand-by protecting element is provided.

In mixed SONET/WDM environment, the WDM link may carry traffic of several SONET rings plus traffic added and dropped at WDM terminals. With the existing deployment strategy of WDM systems, the working and protection fibers are connected to working and protecting WDM terminals, respectively, which provides equipment and fiber protection along WDM links. The WDM equipment is thus protected on 1+1 basis, similar to SONET equipment protection. However, WDM links are not adequately protected against cable cuts. When cable is cut (working and protection fibers are broken), all SONET rings passing through the respective WDM link have to switch independently. Thus, the local failure propagates across the network causing, for the number of channels over 16, traffic perturbation on a national scale. Furthermore, in case of cable cut the traffic added and dropped at WDM terminals is lost. Thus, any capacity upgrade provided by WDM link has to be followed by building additional SONET rings which causes additional spending and network complexity due to protection needs only.

Hence, none of the prior art technologies is capable of providing the level of protection for WDM links equivalent to SONET ring protection or sufficient for required network reliability. The present invention suggests to deploy all-optical protection functionality for WDM links before the optical ring architecture is developed.

SUMMARY OF THE INVENTION

It is an advantage of the present invention that the systematic approach is developed for introducing optical protection in the mixed WDM/SONET environment. It is, accordingly, an object of the present invention to provide a system and method for WDM link protection using color-blind and wavelength selective optical switches.

It is a further advantage of the present invention that the fiber (cable) protection functionality is implemented on the optical layer, independently and complementary to SONET protection.

It is a further advantage of the present invention that the optical protection of WDM equipment may be provided on the optical layer which allows to reduce cost and potentially increase system reliability.

The above and other objectives and advantages of the present invention are accomplished by providing method and system for service restoration of an optical fiber communication network. The system comprises a plurality of self healing SONET rings with transmitting an receiving nodes which are interconnected by optical fibers. Each SONET ring passes through a common WDM link, the optical signals of the rings are multiplexed and transmitted through the common WDM link. Each respective transmitting and receiving node comprises SONET and WDM working and protection equipment. Optical switches are deployed at transmitting and receiving nodes and connected to end terminals of WDM link. WDM link according to one embodiment of the present invention comprises a working and protection fibers. A dedicated protection ring is selected from the plurality of self healing rings. This dedicated protection ring is used for transmitting multiplexed optical signal when WDM link has failed. During the operation the integrity of WDM link should be monitored for determining the failure of WDM link. After the failure of WDM link is detected the multiplexed optical signal is redirected via optical switch to the dedicated protection ring.

According to another embodiment of the present invention the protection of WDM working equipment is provided in addition to the protection of WDM link. The system further comprises at least a pair of WDM working equipment protection switches and at least a pair of wavelength converters. Each protection switch is connected to each wavelength converter, and deployed at the transmitting and receiving nodes, respectively. When WDM working equipment has failed, the optical signal is rerouted via the wavelength converter and the protection switch to the working fiber or dedicated protection ring. The wavelength converter is aligned with the wavelength of said failed WDM equipment.

The foregoing and other objects, features and advantages of the present invention will become apparent from the following detailed description of the preferred embodiment taken together with the accompanying drawings.

DESCRIPTION OF THE PREFERRED EMBODIMENT

According to the present invention, service restoration for WDM links is provided in cases of fiber or cable cuts. A service restoration system switches all WDM traffic to the alternative fiber route using color-blind optical fiber-to-fiber switches. Thus, service protection is instituted on the optical layer, complementary to the SONET protection protocol. For networks implemented in a 4-fiber SONET ring architecture, the present invention allows to retain or enhance the level of protection provided by SONET rings.

Figure 1:
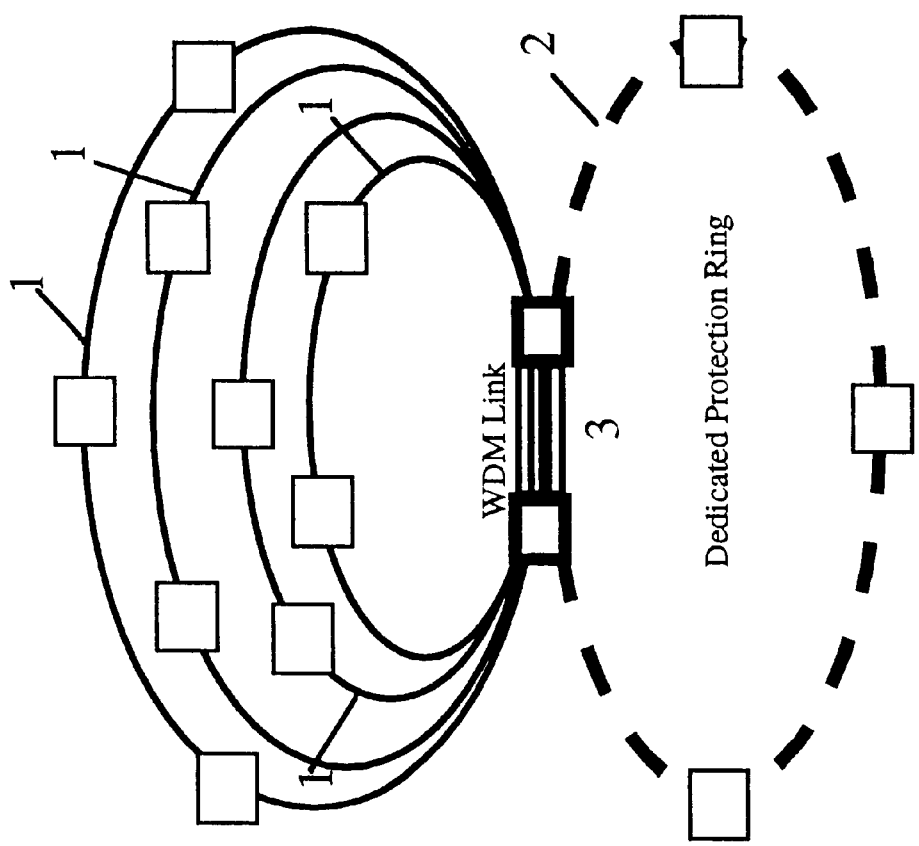
FIG. 1 shows a schematic network diagram where several SONET rings share the WDM link, and one ring is dedicated for optical protection.

The concept of the service restoration for WDM links is schematically shown in FIG. 1 where a plurality of SONET rings 1 and a dedicated protection ring 2 share WDM link 3. Normally, WDM traffic flows along WDM link. In case of cable cut, WDM traffic is rerouted through dedicated protection ring 2. To provide bypass connection between the nodes of WDM link, the system of the present invention employs optical switches.

Figure 2:
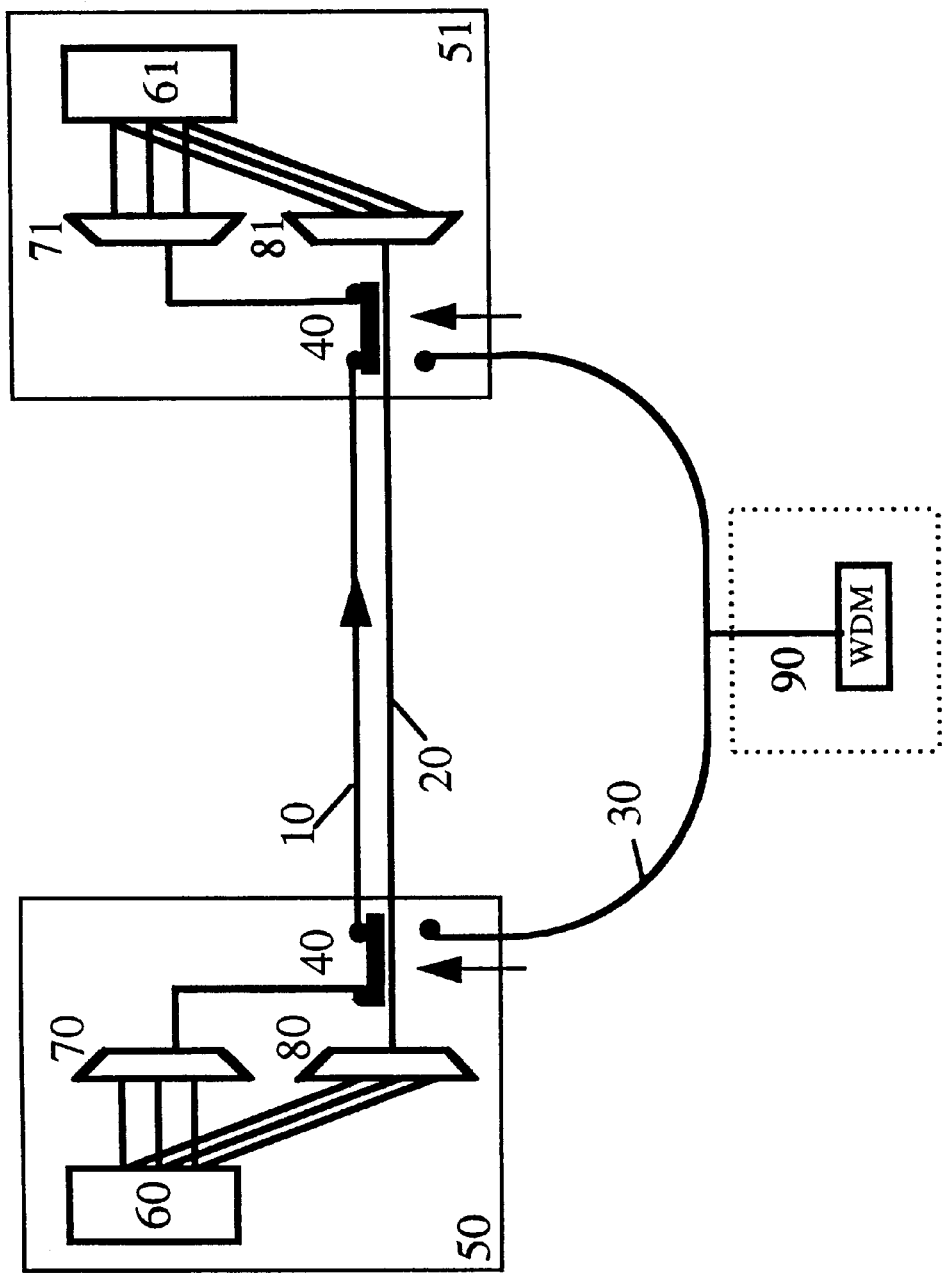
FIG. 2 presents WDM link protection system according to the present invention. Working fiber 10 and protection fiber 20 provide connections between transmitting node 50 and receiving node 51. Protection fiber 30 provides a protection route for the working traffic in case of cable cut.

Referring to FIG. 2, fiber connection for WDM link 3 and dedicated protection ring 2 of FIG. 1 are shown in detail. WDM link fibers comprise working fiber 10 and protection fiber 20, connecting WDM link nodes 50 and 51. At WDM link node 50, SONET equipment 60, working WDM equipment 70 and protection WDM equipment 80 is deployed. WDM link node 50 is a transmitting, and node 51—a receiving node, respectively. At receiving node 51, SONET equipment 61, working WDM equipment 71 and protection WDM equipment 81 is deployed. At each node, SONET equipment is protected on 1+1 basis. Working traffic flows from working WDM equipment 70 through optical switch 40 (arrows in FIG. 2 show the optical switch position) and working fiber 10 to receiving node 51. Protection traffic flows from protection WDM equipment through optical switch (optional, not shown) and protection fiber 20. Traffic direction and optical switch positions are indicated by arrows. Customarily, fibers 10 and 20 follow identical physical path (belong to the same cable). For simplicity, only terminal WDM equipment is shown in FIG. 2. Protection fiber 30 of dedicated protection ring follows a physical path different from fibers 10 and 20. If protection fiber 30 is longer than fibers 10 and 20 additional WDM equipment 90 may be connected to the protection fiber if traffic conditioning (optical amplification or regeneration of the optical signal) is required.

Real SONET/WDM systems are conventionally more complicated than presented in FIG. 2. For example, optical amplifiers may be installed along the WDM link.

In the system of FIG. 2, both fiber and equipment protection is provided. SONET equipment 60 is 1+1 protected (not shown). If working WDM equipment 70 fails, traffic flows through protection WDM equipment 80 and protection fiber 20. Consequently, the system retains all protection capabilities of SONET systems.

Figure 3:
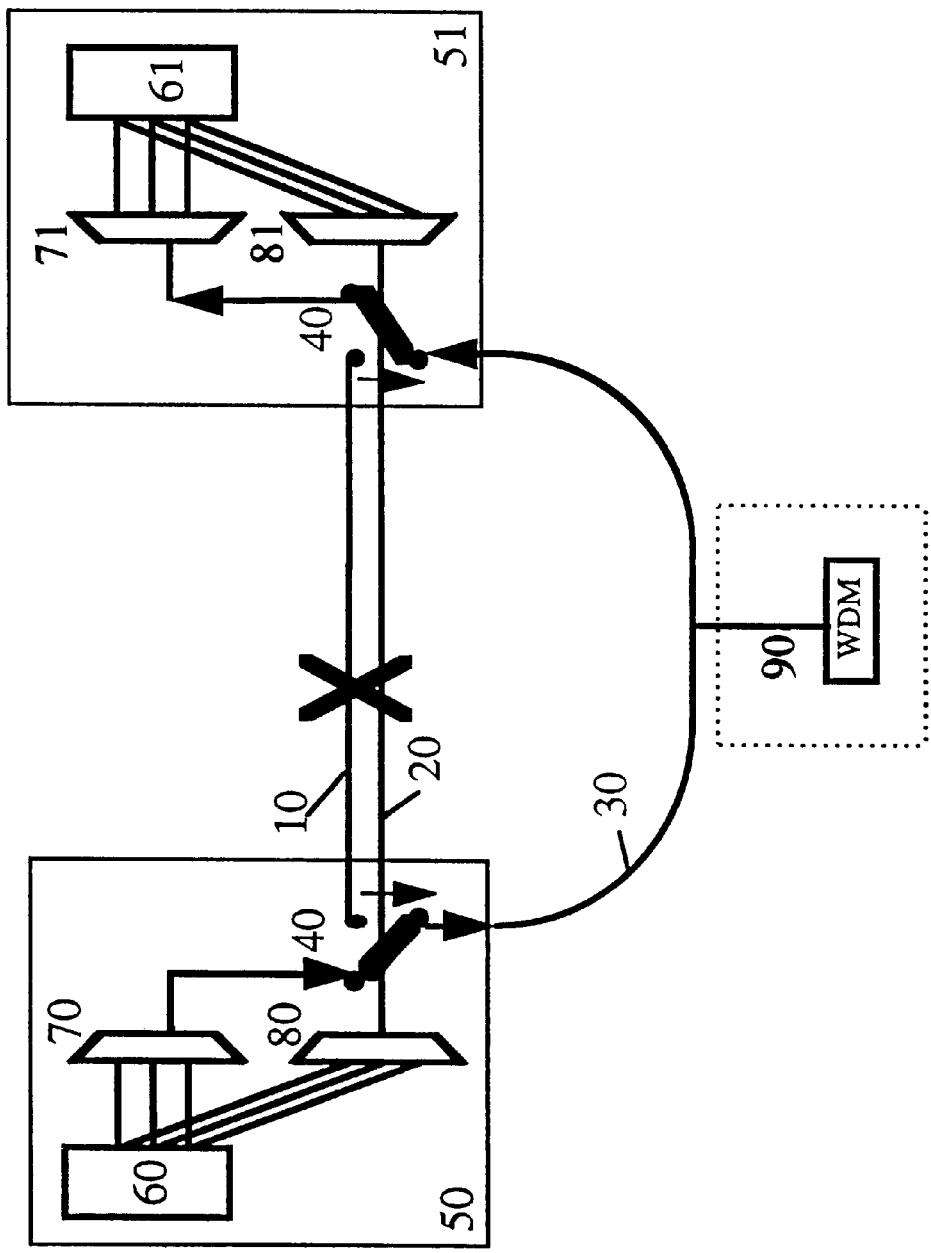
FIG. 3 presents fiber connections between transmitting and receiving nodes in case of cable cut when both working and protection fibers are broken.

Fiber protection is provided by optical switching as shown in FIG. 3. If the cable is cut, usually both working fiber 10 and protection fiber 20 are broken. In this case, optical switches 40 switch working traffic to protection fiber 30 as indicated by arrows in FIG. 3. After switching, the working traffic flows from WDM equipment 70 through optical switch 40 and protection fiber 30. For SONET ring architecture, fiber 30 is a protection fiber of the dedicated protection ring 2 of FIG. 1. For other architectures (mesh), the shortest possible protection fiber path should be selected.

Optical switches employed by the system of the present invention should be optically transparent in the spectral windows of 1310 nm and 1550 nm of the optical fiber, and color-blind, or nondiscriminative between the wavelengths involved in WDM transmission. Structural simplicity, low cost and reliability are leading requirements to the optical switches. Optical switch 40 being connected in series with optical fibers 10 and 30, as shown in FIG. 2 and 3, respectively, may constitute a single point of failure if the switch loses connectivity or ability to switch. Thus, the optical switch reliability is an essential requirement to the protection system. To provide required reliability the optical switch should be simple in architecture, preferably passive (not include lasers, optical amplifiers etc.), and have minimum optical loss. Universal switch designs with N×N non-blocking configurations are less preferable in view of the above considerations. The tolerated loss is determined by interoperability requirements for SONET and WDM equipment. The difference between power penalties for different switch configurations should be comparable to tolerances for power loss of fiber connectors. Different types of color-blind optical switching elements (polymer, optomechanical and others) may be utilized in the optical switch design.

For service restoration, switching time of the optical switch 40 is also critical. It is preferable to have optical layer switching time significantly shorter than SONET protection switching time (50 msec). Though some types of optical switches are very fast (for example, electro-optical switches may switch in several nanoseconds), these switches are lossy. The switching time of low loss optical switches (optomechanical and thermo-optical) is of the order of 1 msec. This switching time allows compliance with time intervals specified by SONET standards.

To detect fiber or cable cuts, WDM link nodes as well as dedicated protection ring nodes should communicate to each other on the optical layer independently of the SONET protocol. For this purpose, independent signaling between the nodes (pilot tone) is established. At each node, pilot tone transmitter and receiver are deployed transmitting and receiving reports on fiber integrity, and detecting WDM link failure. Pilot tone equipment should be protected to achieve high reliability.

Described protection functionality works independently and complementary to the conventional SONET protection.

For example, if the fiber cut occurs on a single wavelength SONET link, the optical layer is not involved, and protection switching is conducted by SONET routine.

Figure 4:
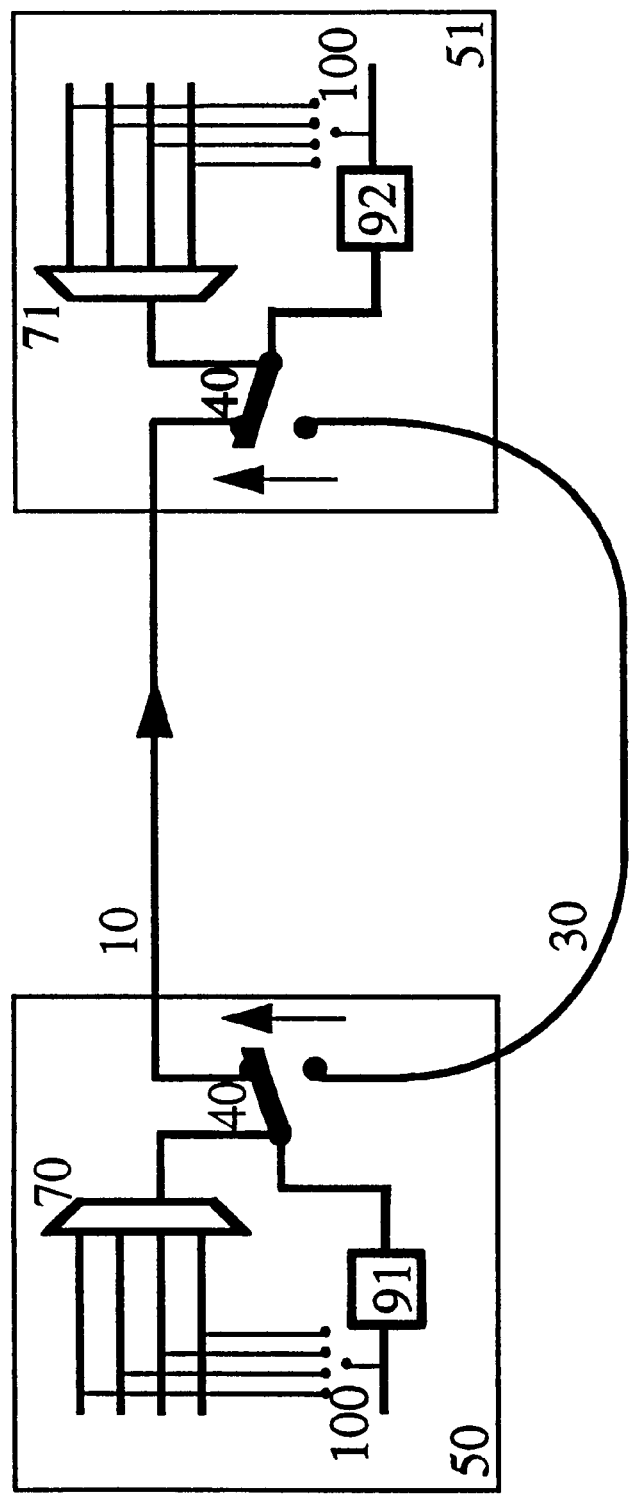
FIG. 4 presents fiber connection between transmitting node 50 and receiving node 51, with WDM equipment protection on 1:N basis.

According to another embodiment of the present invention, SONET and WDM equipment protection may be also performed on the optical layer. In FIG. 4, WDM link nodes 50 and 51 include, together with respective SONET equipment and working WDM equipment 70, 71, optical switches 100 and at least one wavelength converter 91, 92, each for transmitting and receiving nodes, respectively. In normal operation, traffic flows from transmitting SONET equipment (not shown in FIG. 4) through optical switch 40 and working fiber 10. Optical switch 100 is disconnected from wavelength converter 91. In case of working fiber cut, optical switch 40 switches the working traffic from WDM equipment 70 to protection fiber 30. This protection mode of operation is identical to protection switching of FIG. 2 and 3. In case of failure of one of WDM equipment channels, instead of 1+1 protection used in the embodiment of FIG. 2 and 3, the optical switch 100 connects the SONET equipment transmitting traffic dedicated to failed WDM equipment channel, to the wavelength converter 91. Wavelength converter 91 is aligning its wavelength to the wavelength of failed WDM equipment and transmits this traffic through optical switch 40 and further through working fiber 10. If the failure occurs on the receiving end, wavelength converter 91 tunes to the frequency of failed receiver. The advantage of the embodiment of FIG. 4 is that the failure may be localized and healed without reporting to the adjacent nodes. On the receiving side, there will be no indication that the traffic is transmitted through the wavelength converter, not through WDM equipment. This embodiment provides significant equipment savings. With two or more "stand-by" wavelength converters in the protection path. The degree of protection higher than conventional 1+1 SONET protection can be achieved. Only WDM equipment protection was described here; with minor modifications, SONET equipment may be optically protected as well.

Figure 5:
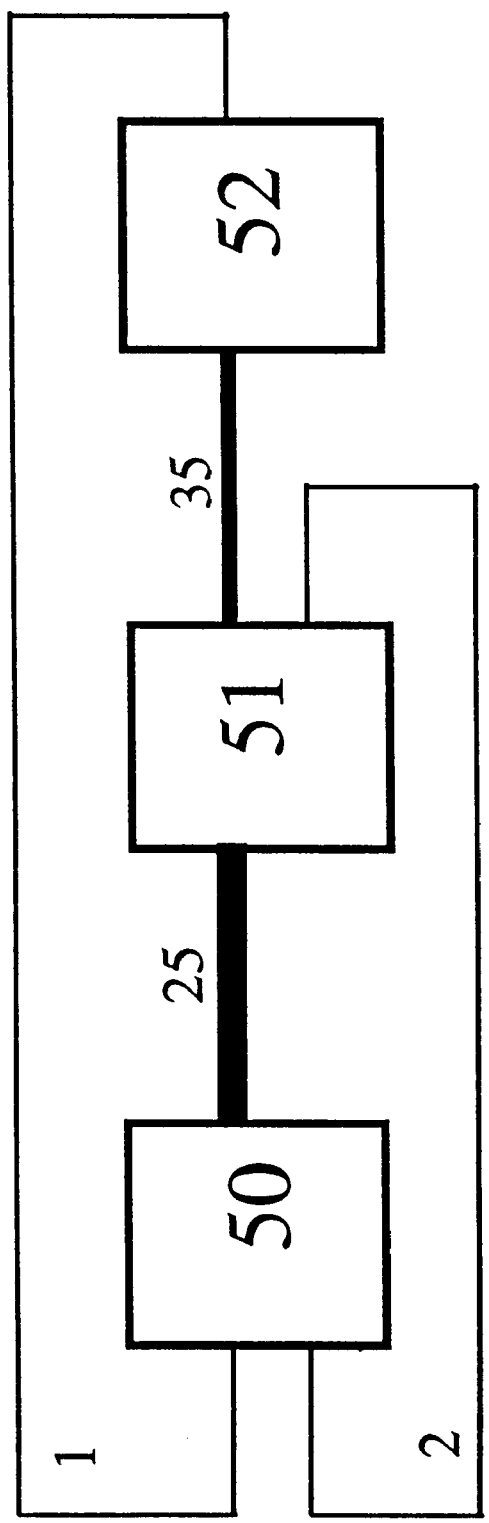
FIG. 5 presents a diagram for complex network configuration when a plurality of nodes is connected by WDM links carrying a different number of wavelengths, and at least two rings are dedicated for optical protection.
Figure 6:
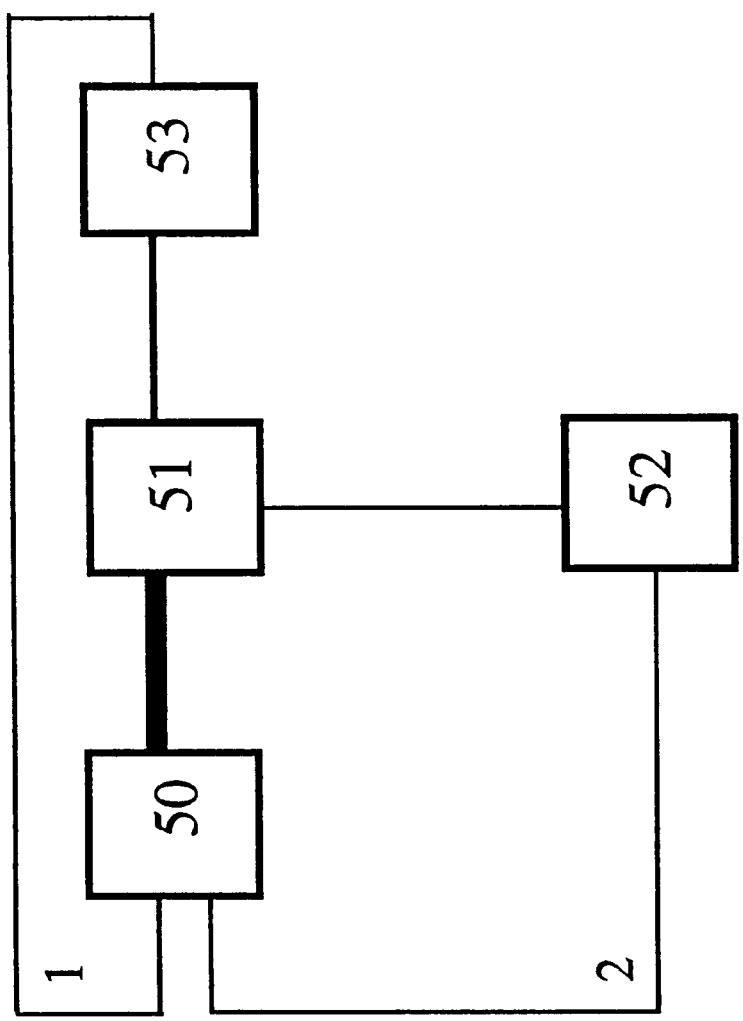
FIG. 6 presents yet another diagram for complex network configuration with WDM links between nodes when each link carries different traffic, and at least two rings are dedicated for optical protection.

Yet another embodiment of the present invention relates to the networks with complex ring configurations, comprising more than one WDM link, or other (for example, mesh) architectures. In those cases, more than one dedicated protection ring or dedicated protection fiber route may be used. Examples of complex ring configurations include but are not limited to those shown in FIG. 5 and 6. In FIG. 5, the network fraction is presented which includes two WDM links 25 and 35 between the nodes 50, 51 and 52 respectively. The nodes are connected in series and may carry, in general, a different number of wavelengths, because several WDM channels may be dropped/inserted at the intermediate node 51. In FIG. 6, a T-section of the WDM network is presented, where three WDM links meet connecting nodes 50 and 51, 51 and 52, 51 and 53, respectively. For the networks of FIG. 5 and FIG. 6, at least two external rings 1 and 2 may be used for protection switching. For the system of FIG. 5, choice between the rings 1 and 2 depends on reliability, cost and other economical factors involved. For the system of FIG. 6, the choice of both rings (1 and 2) is mandatory.

Figure 7:
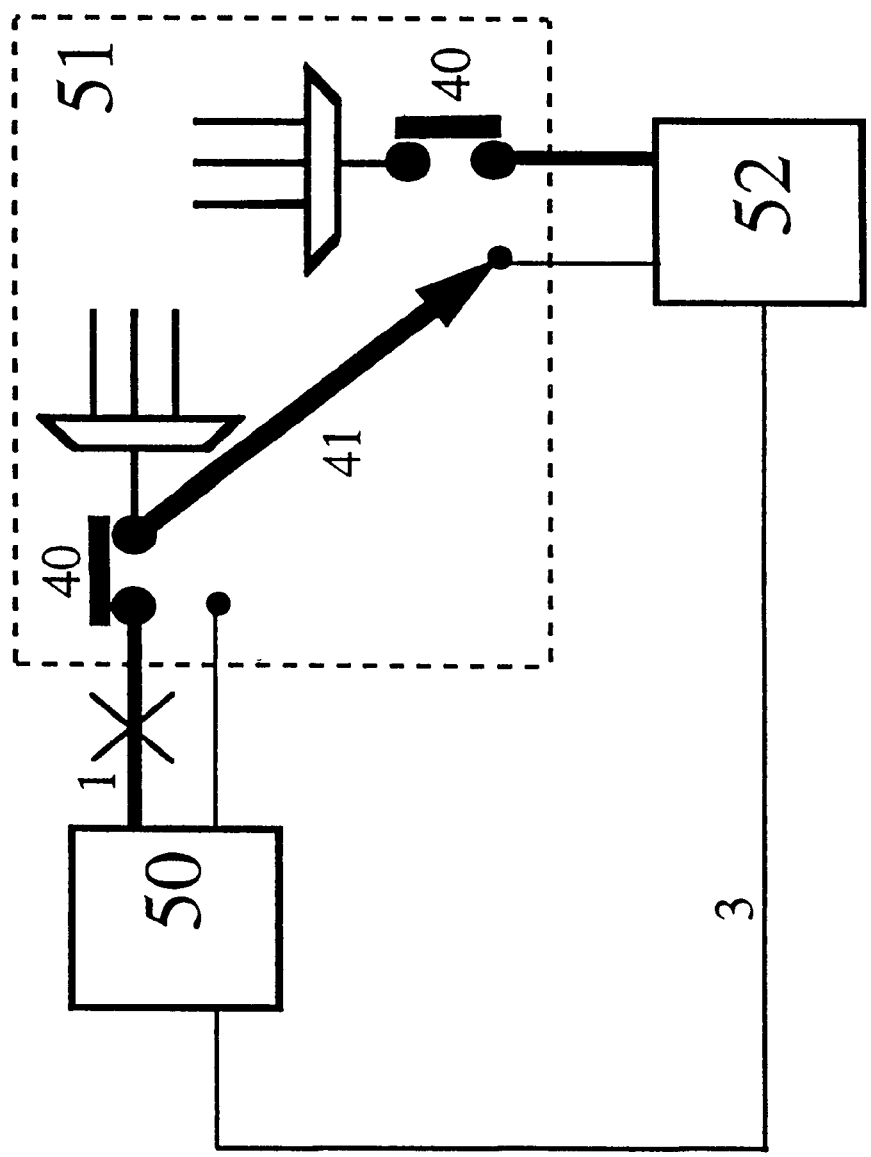
FIG. 7 presents fiber connection diagram for a three-node fraction of the network of FIG. 6.
Figure 8:
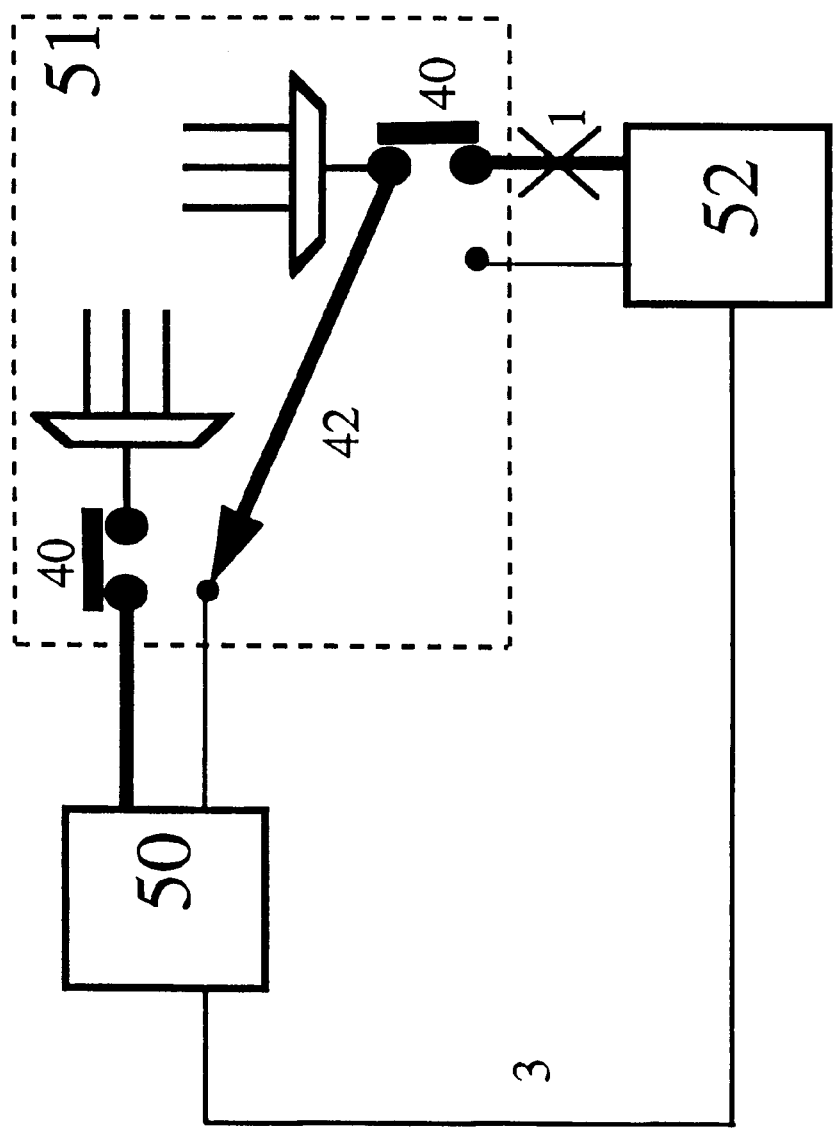
FIG. 8 presents yet another fiber connection diagram for a three-node fraction of the network of FIG. 6.

In FIG. 7 and 8, fiber connection diagrams for a T-section of WDM network of FIG. 6 are presented. In FIG. 7, fiber 1 carries working WDM traffic through optical switch 40 between nodes 50 and 51. Arrow 41 shows the optical switch reconfiguration if fiber 1 is cut. After switching, working traffic is rerouted along protection fiber 3. In FIG. 8, fiber 1 carries working WDM traffic through optical switch 40 between nodes 51 and 52. Arrow 42 shows the optical switch reconfiguration if fiber 1 is cut. After switching, working traffic is rerouted along protection fiber 3.

Though the method was developed for mixed SONET rings/WDM link architecture, it can be used with other network architectures as well. While there have been shown and described what are at present considered preferred embodiments of the present invention, it will be obvious to those skilled in the art that various changes and modifications may be made therein without departing from the scope of the invention as defined by the appended claims.

What is claimed is:

1. A service restoration system for an optical fiber communication network comprising:

a plurality of self healing SONET rings, each said self healing SONET ring comprising transmitting and receiving nodes interconnected by optical fibers;

at least one WDM link being shared by said plurality of said self healing SONET rings for transmitting multiplexed optical signals therethrough;

a dedicated protection ring being selected from said plurality of said self healing SONET rings and employed for transmitting said multiplexed optical signals when said at least one WDM link has failed; and at least a pair of optical switches, each said optical switch associated with respective transmitting and receiving nodes for rerouting said multiplexed optical signals through said selected dedicated protection ring.

2. The service restoration system of claim 1, wherein said at least one WDM link further comprises a working fiber and a protection fiber.

3. The service restoration system of claim 2, wherein each said optical switch is connected in series with said working fiber of said WDM link or dedicated protection ring.

4. The service restoration system of claim 3, wherein said receiving and transmitting nodes each further comprises SONET working and protection equipment, WDM working and protection equipment, wherein in normal working operation the optical signal is transmitted between said working WDM equipment of said transmitting and receiving nods via at least a pair of said optical switches and said working fiber of said WDM link; upon failure of said WDM equipment, the multiplexed optical signals are transmitted between said protection WDM equipment of said transmitting and receiving nodes via said at least a pair of optical switches and said protection fiber of said WDM link; and upon failure of said WDM link, the multiplexed optical signals are transmitted between said working WDM equipment of said transmitting and receiving nodes via at least a pair of optical switches and said dedicated protection ring.

5. The service restoration system of claim 4, wherein said optical switches are nondiscriminative between multiplexed optical signals having the wavelengths employed by said WDM link.

6. The service restoration system of claim 5, wherein said optical switches are optically transparent for multiplexed optical signals having wavelengths in a range between about 1310 nm and 1550 nm.

7. The service restoration system of claim 6, wherein the lengths of said working fiber, protection fiber and dedicated protection ring are relatively comparable.

8. The service restoration system of claim 6, wherein the length of said dedicated protection ring is substantially longer than the length of each said working and protection fiber.

9. The service restoration system of claim 8, further comprises an additional WDM equipment which is deployed at said dedicated protection ring for conditioning WDM traffic through said dedicated protection ring.

10. The service restoration system of claim 9, wherein an optical layer switching time is substantially shorter than SONET protection switching time.

11. A service restoration system for optical fiber communication network comprising:

a plurality of self healing SONET rings, said self healing SONET rings comprising a plurality of SONET and WDM receiving and transmitting nodes interconnected by optical fibers;

at least one WDM link being shared by said plurality of said self healing SONET rings, said WDM link being located between said receiving and transmitting nodes and having a working fiber for transmitting multiplexed optical signals therethrough;

WDM working equipment deployed at said WDM receiving and transmitting nodes respectively having a plurality of WDM channels for providing traffic along said channels from said plurality of said self healing rings through said at least one WDM link;

a dedicated protection ring being selected from said plurality of said self healing SONET rings and employed for transmitting said multiplexed optical signals when said at least one WDM link has failed;

at least a pair of fiber protection switches each being deployed at said receiving and transmitting nodes respectively for rerouting said multiplexed optical signals through said dedicated protection ring when said at least one WDM link has failed;

at least a pair of WDM working equipment protection switches, each being deployed at said receiving and transmitting nodes respectively; and at least a pair of wavelength converters each being coupled to each said WDM working equipment protection switch and deployed at said receiving and transmitting nodes respectively, wherein when at least one of channels of said plurality of WDM channels has failed, said traffic is rerouted via said WDM working equipment protection switch and wavelength converter to said working fiber of said WDM link.

12. The service restoration system of claim 11, wherein an optical signal of said wavelength converter is adjusted to match the wavelength of a multiplexed optical signal of said failed WDM channel.

13. A method for service-restoration of an optical network having a plurality of SONET self healing rings, each said ring having transmitting and receiving nodes interconnected by optical fibers, and at least one common WDM link with working and protection fibers deployed between said nodes, each said respective node comprising SONET working and protection equipment and WDM working and protection equipment for carrying traffic between said transmitting and receiving nodes via said WDM link, the method comprising the steps of:

monitoring the integrity of said common WDM link;

detecting failure of said common WDM link;

selecting at least one self healing ring from said plurality of SONET self healing rings and dedicating said at least one self healing ring for protection of said common WDM link; and redirecting traffic of said WDM link through said selected at least one self-healing ring.

14. The method of service restoration of claim 13, wherein the step of monitoring the integrity of said common WDM link further comprising the steps of:

providing a pilot optical signal by pilot tone transmitting and receiving equipment which is deployed at said respective transmitting and receiving nodes, said pilot optical signal has a wavelength different from wavelengths of WDM traffic;

propagating said pilot optical signal between said pilot tone transmitting a receiving equipment via said common WDM link; and monitoring the propagation of said pilot optical signal.

15. The method of service restoration of claim 14, further comprising the step of detecting the interruption of said pilot optical signal caused by failure of said common WDM link.

16. The method of service restoration of claim 15, wherein the step of redirecting said WDM traffic further comprises the step of switching said traffic by utilizing wavelength nondiscriminative optical switches, each of said wavelength nondiscriminative optical switches is connected to a respective end terminal of said common WDM link and associated with said respective transmitting and receiving nodes.

17. The method of service restoration of claim 16, further comprising the step of protecting said WDM working equipment which comprises the steps of:

providing at least one protection optical switch and a wavelength converter at each terminal end of said common WDM link;

detecting failure of at least one channel of said WDM working equipment; and redirecting traffic to said working fiber of said WDM link or selected self healing ring via said protecting optical switch and wavelength converter.

18. The method of service restoration of claim 17, further comprising the step of tuning said wavelength converter to a wavelength of said failed WDM working equipment.

* * * * *